United States Patent
Lleyda Dionis et al.

(10) Patent No.: US 10,221,835 B2
(45) Date of Patent: Mar. 5, 2019

(54) MULTI-PLATFORM WIND TURBINE TOWER

(71) Applicant: DREIVENTUM, S.L.U., Madrid (ES)

(72) Inventors: Jose Luis Lleyda Dionis, Madrid (ES); Jorge Enrique Jimeno Alonso, Madrid (ES)

(73) Assignee: DREIVENTUM, S.L.U., Madrid (ES)

( * ) Notice: Subject to any disclaimer, the term of this patent is extended or adjusted under 35 U.S.C. 154(b) by 0 days.

(21) Appl. No.: 15/769,802

(22) PCT Filed: Oct. 24, 2016

(86) PCT No.: PCT/ES2016/070749
§ 371 (c)(1),
(2) Date: Apr. 20, 2018

(87) PCT Pub. No.: WO2017/068225
PCT Pub. Date: Apr. 27, 2017

(65) Prior Publication Data
US 2018/0313333 A1 Nov. 1, 2018

(30) Foreign Application Priority Data
Oct. 22, 2015 (ES) .................................. 201531514

(51) Int. Cl.
*F03D 13/20* (2016.01)
*E04H 12/12* (2006.01)

(52) U.S. Cl.
CPC ............. *F03D 13/20* (2016.05); *E04H 12/12* (2013.01); *F05B 2240/221* (2013.01); *F05B 2240/912* (2013.01); *Y02P 70/523* (2015.11)

(58) Field of Classification Search
CPC .... F03D 13/20; E04H 12/12; F05B 2240/221; F05B 2240/912
(Continued)

(56) References Cited

U.S. PATENT DOCUMENTS 3,846,042 A * 11/1974 Keene ..................... F04D 25/02
415/908
4,045,147 A * 8/1977 Curp ....................... A01G 13/08
416/100

(Continued)

FOREIGN PATENT DOCUMENTS

| DE | 10336998 A1 | 3/2005 |
|---|---|---|
| ES | 2545038 A1 | 9/2015 |

*Primary Examiner* — Beth A Stephan
(74) *Attorney, Agent, or Firm* — Dickinson Wright PLLC

(57) ABSTRACT

The purpose of the invention is to provide a multi-platform tower that allows production costs to be significantly reduced, since the tower is suitable for different types of turbines. For this purpose, the improvements consist in obtaining a profile which is based on frustoconical sections having various inclinations and which corresponds geometrically with a load envelope obtained from the superimposition of theoretical profiles of respective towers designed specifically for a plurality of different turbines. Given that the lower part of the turbine comprises securing means having a different diameter, it is necessary to include a series of adaptors or reels (4-4') having a frustoconical configuration and which allow the tower to be adapted to any type of turbine. If necessary, a second adaptor (11), formed consisting of ring in the form of a wedge, could be included, the adaptor modifying the angle of the plane in which the blades rotate, thereby distancing the free end of the blades from the tower.

3 Claims, 4 Drawing Sheets

(58) Field of Classification Search
USPC .............................................. 416/9; 52/126.1
See application file for complete search history.

(56) References Cited

U.S. PATENT DOCUMENTS

| | | | | |
|---|---|---|---|---|
| 5,354,175 | A * | 10/1994 | Coleman | F03D 1/0658 |
| | | | | 416/134 R |
| 7,431,567 | B1 * | 10/2008 | Bevington | C08F 10/00 |
| | | | | 416/244 R |
| 8,277,184 | B2 * | 10/2012 | Nies | F03D 80/70 |
| | | | | 416/148 |
| 8,826,614 | B2 * | 9/2014 | Garcia Maestre | E04H 12/085 |
| | | | | 52/223.5 |
| 9,982,659 | B1 * | 5/2018 | Leonard | E04H 12/085 |
| 2002/0157328 | A1 * | 10/2002 | Holder | E04F 13/0853 |
| | | | | 52/126.1 |
| 2006/0159550 | A1 * | 7/2006 | Nagao | F01D 1/30 |
| | | | | 416/132 B |
| 2011/0107684 | A1 * | 5/2011 | Flores | F03D 9/00 |
| | | | | 52/29 |
| 2011/0262272 | A1 | 10/2011 | Nies et al. | |
| 2012/0023860 | A1 * | 2/2012 | Voss | F03D 13/20 |
| | | | | 52/651.09 |
| 2012/0025538 | A1 * | 2/2012 | Luneau | B22C 7/00 |
| | | | | 290/55 |
| 2015/0204101 | A1 | 7/2015 | Zhao et al. | |
| 2017/0016242 | A1 | 1/2017 | Jimeno Chueca et al. | |
| 2017/0204836 | A1 * | 7/2017 | Jimeno Chueca | F03D 13/22 |

* cited by examiner

A-B

MULTI-PLATFORM WIND TURBINE TOWER

OBJECT OF THE INVENTION

The present invention relates to a wind turbine tower of those meant to support the corresponding wind turbine as a means for generating electrical energy.

The object of the invention is to provide a multi-platform or multi-turbine tower that assists in cost savings in the manufacture of these types of structures, such that the same does not need to be designed specifically for each type of turbine present in the market but, using a single tower model, such as with a 120 meter shaft, the tower can be perfectly used for a plurality of turbines of various manufacturers, such that this polyvalent use allows obtaining greatly significant economic savings in the long run.

BACKGROUND OF THE INVENTION

In the field of practical application of the invention, that of concrete wind turbine towers, hitherto each wind tower was designed specifically for the turbine model to be installed therein, resulting in extremely high costs that are obviously worth minimizing.

Although invention patent P201430312 by the applicant describes a structure based on frustoconical sections of different inclinations, which allows obtaining from straight segments a broken profile as close as possible to the theoretical optimum curved profile intended for the tower, thereby reducing the cost of manufacture of these type of structures, this structure continues requiring a specific design of each tower for each turbine.

DESCRIPTION OF THE INVENTION

The present invention bases its features on obtaining a tower from sections that define segments for said frustoconical configuration tower, with the special particularity that from specific features of the design of the tower it is possible for the tower to have an extremely versatile nature, which is value for supporting with full safety guarantees various types of turbines available in the market with the interposition of one or possibly two simple adaptors.

For this purpose, in view of the need to provide a tower with a shaft height on the order of 120 meters, it has been foreseen that the tower design consists in a load envelope according to the specifications of each of the manufacturers.

The geometrical fit is based on parameters such as the maximum diameter admitted at blade tip and the frequency range to prevent the tower from entering in resonance and causing the amplification of the acting loads.

However, two alternative ways of obtaining the tower have been foreseen:
  Complying in all the sections with the condition of maximum diameter admitted at blade tip (a known parameter);
  Complying in most sections with the condition of maximum diameter admitted at blade tip, such that when this cannot be achieved, a minimum conning angle is applied.

In either case, the division into sections of the tower is defined by the transportation criteria, preferably limiting the maximum section weight to 55 tons, its maximum width to 4.5 meters, and its maximum length to 24 meters.

With regard to the frequency range, the data corresponding to the various types of turbines are used to calculate upper and lower limits thereof.

Similarly, it is necessary to check decompression at the tips, which conditions prestressing on site, indirectly controlling the distance between securing points.

At the same time, it is necessary to check the minimum prestress level at the segments prestressed in the workshop, check flexion and flushing at the joints, which conditions passive assembly at joints.

In view of this structure a multi-platform or multi-turbine tower is obtained that can support the loads of many different market-available turbines; as each turbine has securing bolts arranged annularly, with a diameter that is different for different turbines, it is necessary to adapt the diameter of the upper end or coronation of the tower to the diameter of the lower securing means of the turbine, for which the inclusion has been foreseen of adaptors or reels, embodied as metal bodies with a preferably frustoconical configuration, which can converge or diverge in an upward sense so that in every case a lower circular base is defined with a diameter matching that of the tower coronation, with a peripheral flange having orifices for passage of the corresponding securing bolts, while the upper diameter of the reel will be different for each turbine type, according to the specific needs of each case, and can be greater or smaller than the diameter of the tower coronation, consequently determining the inverted or non-inverted arrangement of the frustoconical configuration of the reel.

Naturally, at the upper base of the reel a peripheral flange will also be defined having the corresponding securing orifices for bolting the turbine.

Obviously, the generatrix of the adaptor does not have to be precisely straight to obtain the same end, such that it could be curved or broken, without this affecting the essence of the invention as this would merely correspond to design alternatives.

Although the geometrical study of the tower has considered the blade tip issue—the maximum diameter at the blade tip—there may be turbine models in which the blades have insufficient separation, such that because of the configuration of the tower the ends of the blade during rotation follow a trajectory that is too close to the tower at said point (as the tower cross-section increases in a downward sense). For this reason, the existence of a second type of adaptor meant to slightly modify the position of the horizontal shaft of the generator moving it to a position insignificantly inclined, such that the sweeping plane of the blades passes from a vertical position to a slightly inclined position, and therefore the blade tips will be separated from the tower.

This second adapter consists in a type of circular crown, with a wedge-like profile, i.e. with a varying thickness, the variation in width between the ends thereof obviously depends on the change in the inclination of the blades that must be achieved.

By way of example, a change in 1 degree of the verticality plane of the blades would increase by more than one meter the separation of the tips of said blades with respect to the tower at said tip area for blades measuring 60 meters.

Since the turbines can turn to adapt to different wind directions, this wedge-like element is placed between the hinging means of the turbine and the general structure of the turbine, thereby maintaining the distance between the blade tips and the tower regardless of the orientation of the axis of rotation of the blades.

In this way it is possible to adapt many different types of turbines to a single tower which, although oversized and possibly more expensive to manufacture per unit, represents great economic savings as it is not necessary to manufacture a specific tower for each turbine.

DESCRIPTION OF THE DRAWINGS

To complete the description made below and in order to aid a better understanding of the characteristics of the invention, a set of drawings is accompanied as an integral part of the description with reference to a preferred example practical embodiment of the invention where, for purpose of illustration only and in a non-limiting sense, the following is shown.

PREFERRED EMBODIMENT OF THE INVENTION

Figure 1:
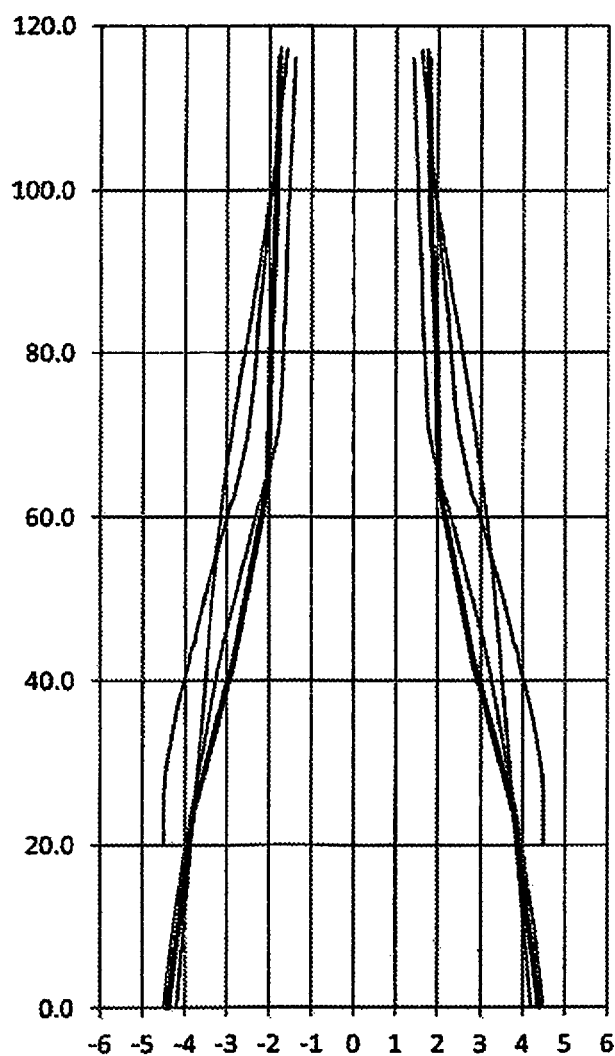
FIG. 1 shows a representation of a comparison of geometries of different towers needed to support different types of turbines, from which a load envelope is obtained for the new tower that allows admitting with complete certainty all the different types of turbines, for a height of 120 meters; this profile is represented by a thickness line, with six sections marked into which the tower body is divided, although this tower could optionally be divided into any number of sections.

FIG. 1 represents in thinner lines the theoretical profiles for obtaining different types of towers of 120 meters, according to the specifications of a number of turbines.

As shown in thicker lines, the improvements of the invention allow obtaining a profile for the tower that geometrically matches the load envelope obtained by superimposing the aforementioned theoretical profiles.

In the present example a tower is selected obtained from six segments although, as indicated above, the tower can also be obtained from any number of segments.

For this tower of invariable dimensions, a fixed upper diameter is defined at its end or coronation (1) which obviously does not have to match the various diameters of the lower securing means (2) that are defined in correspondence with the lower face of each turbine (3).

Figure 2:
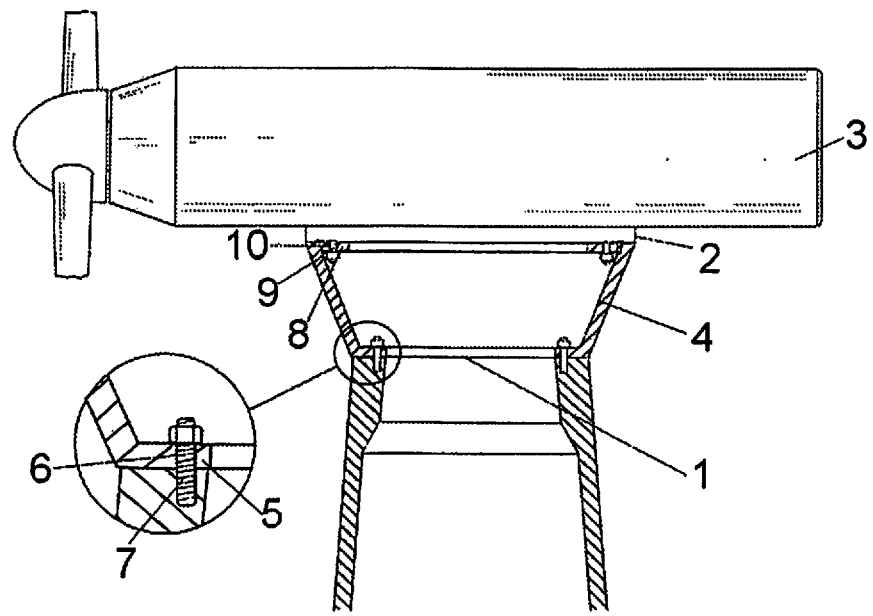
FIG. 2 shows an enlarged side view and cross sectional view of the means for adapting and securing the tower to a first turbine type, where the lower radius of the turbine is greater than that of the coronation of the multi-platform or multi-turbine tower.
Figure 3:
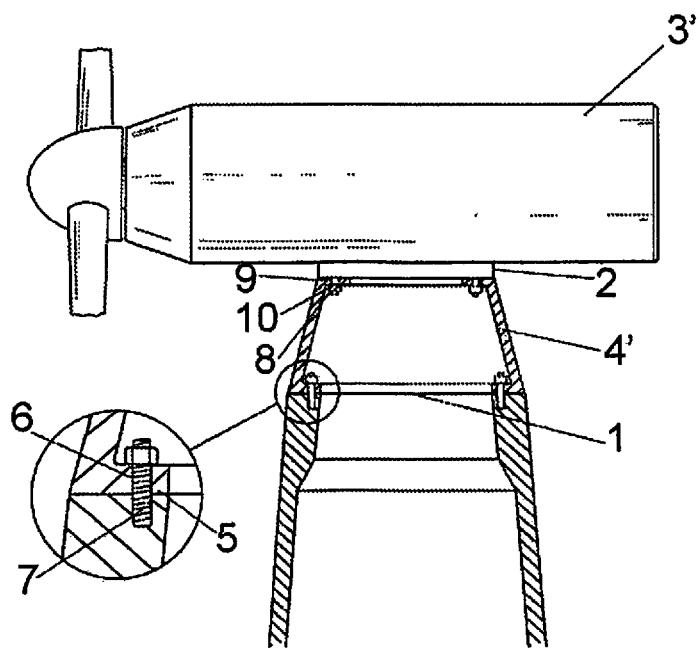
FIG. 3 shows a view similar to FIG. 2, in this case corresponding to a second type of turbine where the lower radius of the turbine is smaller than that of the coronation of the multi-platform or multi-turbine tower.

For this purpose, the interposition is foreseen between these elements of a reel (4-4') embodied as a metal body with a frustoconical configuration, divergent in the case of FIG. 2, i.e., when the diameter of the means of securing the turbine (3) is greater than the diameter of the coronation (1) of the tower, or convergent as in the case of FIG. 3, when the diameter of the means of securing the turbine (3') is smaller than the diameter of the coronation (1) of the tower.

Consequently, the reel (4, 4') presents a lower circular base with a diameter matching that of the coronation (1) of the tower, with an inner and lower peripheral flange (5) having orifices (6) for passage of the corresponding securing bolts (7), while the upper diameter of the reel as shown in the figures will be different for each turbine type, according to the specific needs of each case, also including an inner and upper peripheral flange (8) having orifices (9) for passage of the corresponding securing bolts (10).

Figure 4:
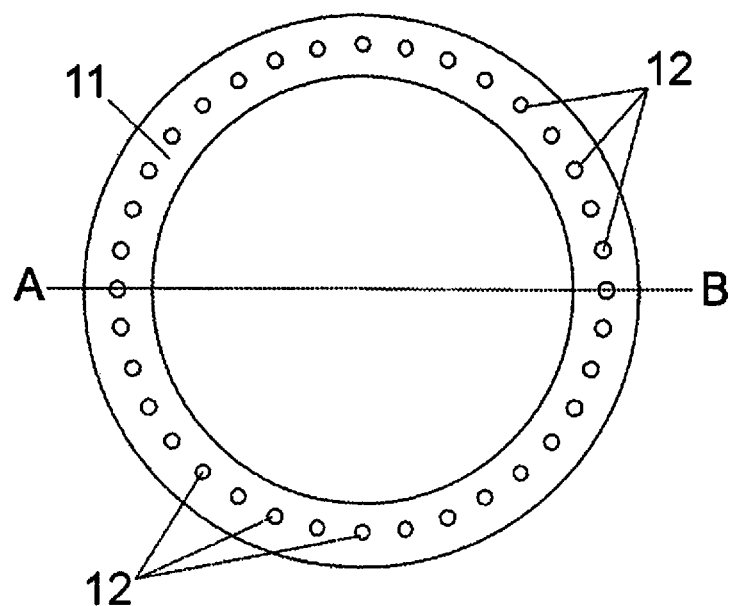
FIG. 4 shows a plan view of the second type of adaptors foreseen for the multi-platform or multi-turbine tower meant to increase the distance between the blade tips and the tower.
Figure 5:
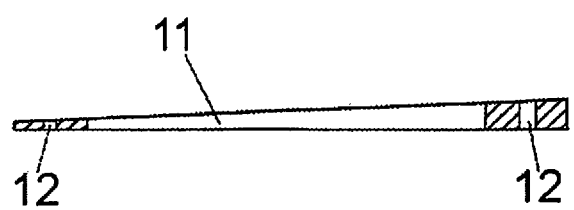
FIG. 5 shows a cross section view of the adaptor of the previous figure along the A-B line.
Figure 6:
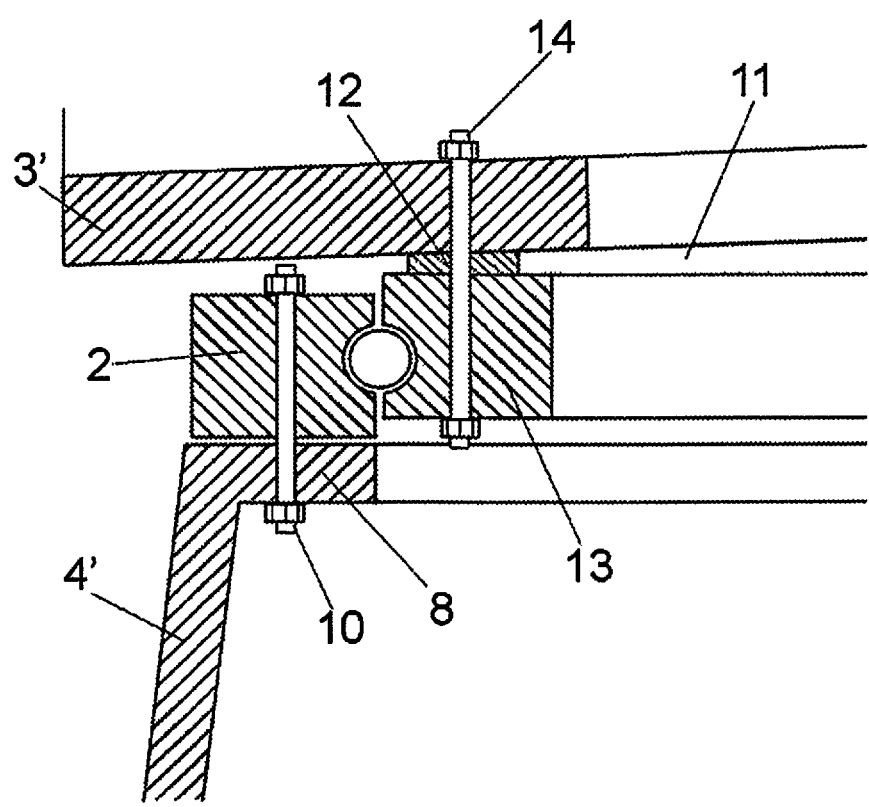
FIG. 6 shows an enlarged cross section of the form of installing the adapter of FIGS. 4 and 5 in a wind turbine.

As indicated above, although the tower has been designed to consider the separation of the blade tips from the tower there may be cases in which a turbine model presents an insufficient separation, the inclusion has been foreseen of a second adaptor (11), as shown in FIGS. 4 and 5, consisting in a type of circular crown, with a wedge-like profile, i.e., with a varying thickness, the variation in width between the ends thereof obviously depends on the change in the inclination of the blades that must be achieved, said crown being provided with a plurality of evenly distributed orifice (12).

This adaptor is placed between the articulation means (13) of the turbine and the general structure thereof, introducing the corresponding bolts (14) thereby allowing maintaining the distance between the blade tips and the tower regardless of the orientation of the rotation axis thereof.

For heights less than 120 meters it is possible to reduce the height of the lower segment of the tower or even to eliminate said segment or more segments depending on the desired tower height.

Similarly, for greater heights one or more segments can be added at the bottom of the tower.

The invention claimed is:

1. Multi-platform wind tower comprising a series of two or more joined vertical concrete segments, and wherein the concrete segments forming the tower have a frustoconical configuration, where each of the concrete segments has a different inclination, such that a broken profile is obtained corresponding to a profile for the tower, characterized in that the broken profile of the tower geometrically corresponds to a load envelope obtained by superposing the concrete segments corresponding to the profile of the towers designed for a turbine, and where the turbine is secured to a top end or coronation (1) of the tower by an adaptor or reel (4, 4') having a metal body with a profile having a lower base with a diameter matching a diameter of the top end or coronation (1) of the tower and an upper base having a diameter of the turbine to be installed, and where said adaptor includes means for securing the lower base to the top end or coronation of said tower and for securing the upper base to the turbine.

2. Multi-platform wind tower, according to claim 1, characterized in that the adapter or reels (4,4') include a corresponding lower (5) flange at the lower base of said adapter or reels and an upper (8) flange at the upper base of said adapter or reel, and where said adapter or reels include orifices (6-9) for the passage of corresponding bolts securing the adapter or reel to the tower coronation and a turbine articulation means.

3. Multi-platform wind tower, according to claim 1, characterized in that when the separation between a free end of turbine blade tips and the tower is not suitable, a second adaptor (11) having a circular crown with a variable thickness and defining a wedge having a plurality of evenly distributed orifices (12) is provided between an articulation means (13) of the turbine and the turbine, by means of corresponding bolts (14).

* * * * *